No. 817,884. PATENTED APR. 17, 1906.
L. A. STAHMER.
TIME FEEDING DEVICE.
APPLICATION FILED FEB. 23, 1905.
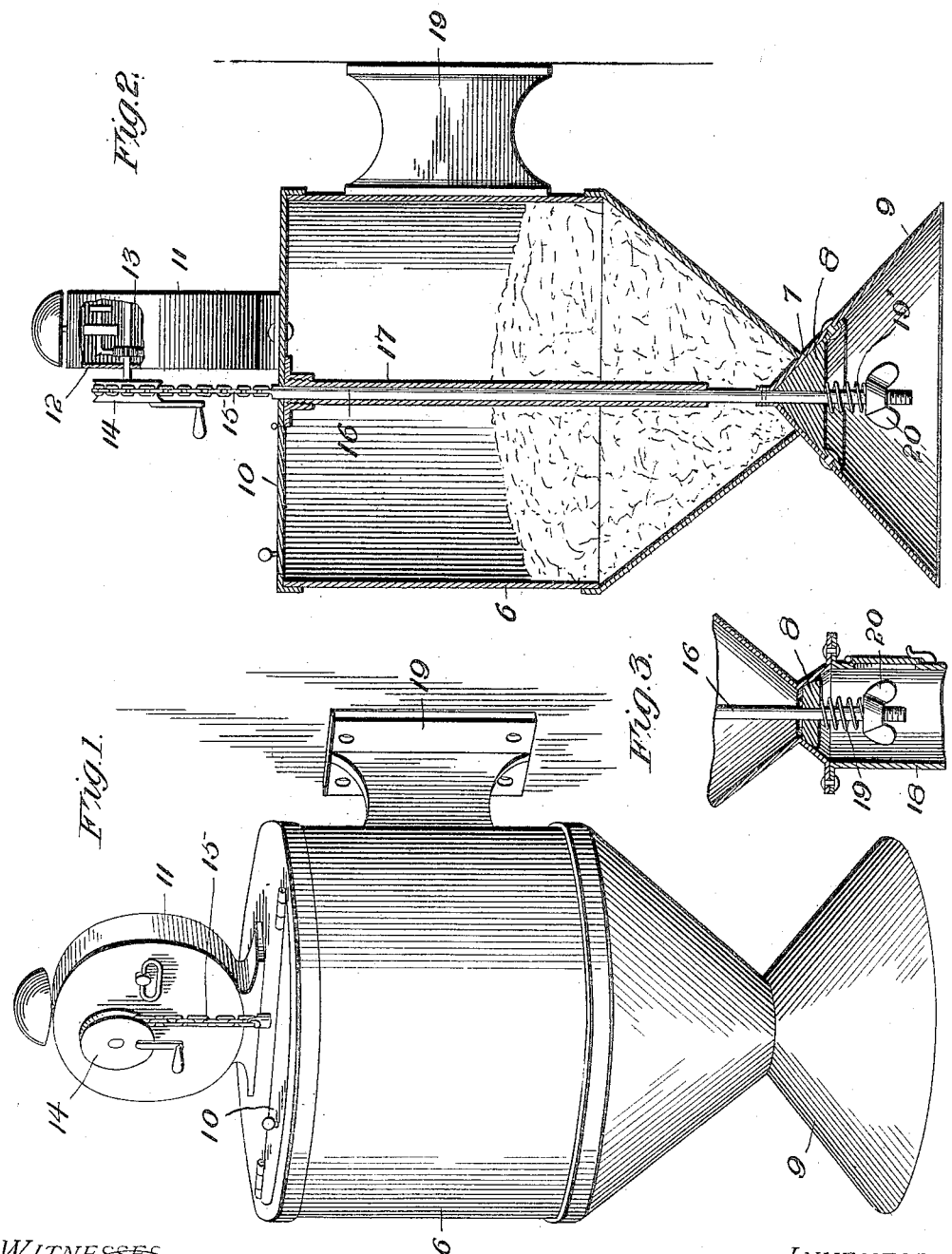
WITNESSES
INVENTOR
Louis A. Stahmer,
BY
Milo B. Stevens &Co.
Attorneys.

UNITED STATES PATENT OFFICE.

LOUIS A. STAHMER, OF OAK PARK, ILLINOIS.

TIME FEEDING DEVICE.

No. 817,884.     Specification of Letters Patent.     Patented April 17, 1906.

Application filed February 23, 1905. Serial No. 246,948.

*To all whom it may concern:*

Be it known that I, LOUIS A. STAHMER, a citizen of the United States, residing at Oak Park, in the county of Cook and State of Illinois, have invented new and useful Improvements in Time Feeding Devices, of which the following is a specification.

This invention is a time feeding device, particularly intended for feeding poultry, but applicable for feeding stock or animals of any kind.

It embodies a hopper for the feed closed at the bottom by a valve which is released by clock-operated means to open and discharge the contents of the hopper at a predetermined time.

When used for feeding poultry, pigeons, and the like, a valve is used having a broad cone, so as to spread the feed broadcast to a considerable extent. When used for feeding stock, a narrow valve is employed with a duct leading therefrom to the manger or wherever the feed is to be served.

In the accompanying drawings, Figure 1 is a perspective view of the invention as used for feeding poultry. Fig. 2 is a vertical section thereof. Fig. 3 is a detail in section of a modified form suitable for horses and such stock.

Referring specifically to the drawings, 6 indicates a hopper of proper size to contain the amount of feed desired to be distributed. The bottom of this hopper inclines to a valve-opening at 7, controlled by a valve 8, which in the embodiment shown in Figs. 1 and 2 carries a cone-shaped distributer (shown at 9) to scatter the feed. The hopper is covered, and the cover has a door 10 to allow the feed to be put in.

11 indicates a clock supported on top of the hopper. This clock may be of any suitable or desired construction and having means to release a detent 12, which holds a ratchet 13 on the shaft of a wheel 14, connected by a chain 15 and rod 16 to the valve 8. The detent may conveniently be located so as to be actuated by movement of the ordinary alarm mechanism of a common alarm-clock. The wheel 14 turns to lift and close the valve. The rod 16 works in a guide-tube 17, depending from the cover of the hopper.

In the form shown in Fig. 3 the valve 8 opens into a tube 18, leading away from the opening in the hopper, and this tube may be extended to the place where it is desired to carry the feed.

With the form shown in Figs. 1 and 2 proper means are used to support the hopper, such as a bracket 19, or the hopper may be hung by a cord tied around the same. In the form shown in Fig. 3 the discharge-tube 18 may act as the support for the hopper or other means may be provided.

The valve 8 is yieldingly supported on the rod 16 upon a spring 19, adjusted by a nut 20 on the lower end of the rod. The purpose of this is to adjust the valve to some extent, so that it will not fit too loosely or too tightly against the bottom of the hopper and will also allow the rod to be adjusted, so that its upper end will be in a proper position with respect to the chain or other connection to the clock.

What I claim as new, and desire to secure by Letters Patent, is—

In a time feeding apparatus, the combination with a hopper for the feed having a discharge-opening at the bottom and a guide-tube extending downwardly from the top toward said opening, of a rod movable up and down in the tube, having at its lower end a plug-valve yieldingly supported thereon and controlling the discharge-opening and carrying a conical spreader under said opening, and time-controlled releasing means connected to the upper end of said rod.

In testimony whereof I have signed my name to this specification in the presence of two subscribing witnesses.

LOUIS A. STAHMER.

Witnesses:
     SIGNA FELTSKOG,
     H. G. BATCHELOR.